United States Patent [19]

Khoylian et al.

[11] 4,232,779
[45] Nov. 11, 1980

[54] INFEED ASSEMBLY AND A DISCHARGE ASSEMBLY FOR A CONVEYOR SYSTEM

[75] Inventors: Rouzas R. Khoylian, Belmont, Mass.; James R. Cowdery, Pellham, N.H.; David B. Park, Wilmington, Mass.

[73] Assignee: Design & Process Engineering, Inc., Billercia, Mass.

[21] Appl. No.: 65,870

[22] Filed: Aug. 13, 1979

[51] Int. Cl.³ .............................................. B65G 37/00
[52] U.S. Cl. ................................... 198/472; 198/482; 198/796; 99/443 C
[58] Field of Search ............... 198/472, 580, 648, 482, 198/796; 99/443 C

[56] References Cited

U.S. PATENT DOCUMENTS 3,993,189  11/1976  Khoylian et al. ................... 198/472
4,143,758   3/1979  Gram ................................. 198/795

FOREIGN PATENT DOCUMENTS

61702  12/1943  Denmark ................................. 198/580

Primary Examiner—Joseph E. Valenza
Attorney, Agent, or Firm—Kenyon & Kenyon

[57] ABSTRACT

The infeed and discharge assemblies are mechanically actuated by movement of the hook assemblies on the endless chains of the horizontal conveyor in order to sequentially direct the flexible carriers into and out of the respective vertical conveyors. Each of the infeed and discharge assemblies includes a pivotally mounted ramp assembly with a pair of latch assemblies at the ends for engaging an aligned pair of tracks in the respective vertical conveyors.

29 Claims, 11 Drawing Figures

INFEED ASSEMBLY AND A DISCHARGE ASSEMBLY FOR A CONVEYOR SYSTEM

This invention relates to an infeed assembly and a discharge assembly for a conveyor system.

As is known, various types of conveyor systems have been constructed to convey products from one conveyor to another conveyor which is aligned in a different manner from the first conveyor. In order to effect delivery of the conveyed products from one conveyor to the other, various means have been employed. For example, where the conveyors have been disposed in adjacent horizontal planes, use has been made of ramps between the two conveyors down which the products may roll or slide from one conveyor to the other. However, in the case of where the conveyors are aligned in different planes, for example one in a horizontal plane and one in a vertical plane, it has been difficult to maintain continuity in the conveyance of the products.

It has also been known, for example as described in U.S. Pat. No. 3,993,189, to convey products on mats or carriers and to utilize various cam operated ramps to guide the conveyed mats, for example from a horizontal conveyor to a vertically disposed conveyor. However, such cam operated ramps are generally driven off the main drive of the conveyors and are associated with various electro-mechanical devices in order to time the operation of the cams with respect to the conveyed products. In the case of a transfer between a vertically disposed conveyor and a horizontal conveyor, it has also been known to use a series of synchronized endless belts to convey products between the two conveyors.

It is an object of this invention to provide an infeed assembly for moving product-receiving carriers in a smooth manner between a horizontally disposed conveyor and a vertically disposed conveyor.

It is another object of the invention to provide a relatively simple infeed assembly for transferring products between a horizontal conveyor and a vertically disposed conveyor.

It is another object of the invention to provide a simple mechanical means of transferring product-receiving carriers between two conveyors aligned in different planes.

It is another object of the invention to provide an assembly for transferring product-receiving carriers between two conveyors which can be simply fabricated and easily maintained.

Briefly, the invention provides infeed and discharge assemblies for moving a product-receiving carrier between a horizontally disposed conveyor having a hook assembly for conveying the carrier thereon and a vertically disposed conveyor for example of a processing conveyor. The horizontal conveyor is constructed with a pair of guide tracks for guiding the carrier and at least one endless chain for movement in an endless path to which the hook assembly is secured for travel therewith. The hook assembly also has a hook for engaging and pulling the carrier along the guide tracks of the conveyor. In addition, the vertical conveyor has a pair of oppositely disposed vertical elevators, each of which has a plurality of tracks for movement in an endless vertically disposed path.

The infeed assembly serves to move the carrier from the guide tracks of the horizontal conveyor onto a pair of opposed tracks of the vertically oriented conveyor while the discharge assembly serves to move the carrier from a pair of opposed tracks of a second similarly disposed vertical conveyor onto the guide tracks of the horizontal conveyor.

The infeed assembly is comprised of a pivotally mounted ramp assembly having a pair of ramp tracks for guiding a carrier, at least one cam means for lowering the ramp assembly in response to the hook assembly moving into a predetermined position and a releaseable latch assembly mounted on at least one of the ramp tracks for engaging with the vertical conveyor during a subsequent upward pivoting of the ramp assembly.

The ramp tracks of the ramp assembly are aligned with the guide tracks of the horizontal conveyor to permit movement of the carrier from the guide tracks onto the ramp tracks.

The cam means includes a cam secured to the ramp assembly with a cam surface for movement of the hook assembly thereon and at least one stationary cam having a cam surface for movement of the hook assembly thereon. The cam surfaces are disposed in crossing relation to each other whereby simultaneous movement of the hook assembly on the two cam surfaces causes a lowering of the ramp assembly.

The latch assembly serves to engage a track of the vertical conveyor to align the ramp tracks with a pair of opposed tracks of the vertical conveyor to permit movement of a carrier from the ramp tracks onto the aligned tracks of the vertical conveyor.

The discharge assembly cooperates with a second vertical conveyor of the processing conveyor and the horizontal conveyor, i.e. near the discharge end of the horizontal conveyor. The discharge assembly is comprised of a pivotally mounted ramp assembly having a pair of ramp tracks for guiding a carrier, at least one cam means for raising the ramp assembly in response to the hook assembly moving into a predetermined position and a releaseable latch assembly mounted on at least one of the ramp tracks for engaging with the vertical conveyor during a subsequent downward pivoting of the ramp assembly.

The ramp tracks of the discharge ramp assembly are aligned with the guide tracks of the horizontal conveyor to permit movement of a carrier from the ramp tracks onto the guide tracks.

The cam means of the discharge assembly includes at least one stationary cam having a cam surface for movement of the hook assembly thereon to raise the hook and a second cam fixedly secured to the ramp assembly and having a cam surface for movement of the hook assembly thereon. The two cam surfaces are disposed in crossing relation so that simultaneous movement of the hook assembly on the cam surfaces causes a lifting of the discharge ramp assembly.

The latch assembly serves to engage a track of the vertical conveyor in order to align the ramp tracks with a pair of opposed tracks of the vertical conveyor to permit movement of the carrier from the aligned tracks of the vertical conveyor onto the ramp tracks.

The latch assemblies which are mounted on the infeed and discharge assemblies are of identical construction and include a spring biased pin directed toward the respective vertical conveyor for engaging with an aligned track of the vertical conveyor. To this end, each track of each vertical conveyor carriers a stabilizer for engagement with the pin. Each stabilizer has an inclined surface for sliding of a pin thereon to cause inward biasing of the pin during a pivoting of the respective ramp assembly. In the case of the infeed assembly, the stabilizers are disposed to engage the pin under a lower edge while, in the case of the discharge assembly, the stabilizers are disposed to engage the pin on an upper edge.

In order to facilitate movement of the hook assemblies on the various cam surfaces, each hook assembly carries a projecting pin to slide on the cam surfaces.

In operation, with the infeed ramp assembly disposed in an elevated position, having guided a preceding carrier onto the ascending tracks of the vertical conveyor, the hook assembly pulling a following carrier on the guide tracks of the horizontal conveyor, moves into engagement with the leading cam surface on the cam secured to the infeed ramp assembly. The hook assembly thus begins to move upwardly while the forward end of the carrier moves onto the upwardly directed ramp tracks.

As the pin of the hook assembly proceeds along, the cam surface of the stationary cam is engaged. At this time, since the pin is sandwiched between the two cam surfaces, the cam which is connected to the ramp assembly is forced to pivot downwardly as the pin proceeds forward. This, in turn, causes the ramp tracks to pivot downwardly. Also, during pivoting of the infeed ramp assembly, the spring biased pin of the latch assembly thereon is pushed inwardly via the inclined surface of the stabilizer of the previously aligned track on the vertical elevator.

As the pin of the hook assembly reaches the lowest point of the cam surface of the stationary cam, the spring biased pin of the latch assembly moves below the lower edge of the stabilizer of the previously aligned track and snaps into engagement with the stabilizer. At this time, the ramp tracks become aligned with the pair of vertical conveyor tracks located immediately below the pin of the latch assembly.

After the hook assembly pin passes the lowest point on the stationary cam surface, the ramp tracks begin to pivot upwardly again due to the engagement via the latch assembly of the ramp tracks with the ascending vertical conveyor tracks. The front end of the carrier is then pulled onto the ascending vertical conveyor tracks from the ramp tracks via the hook assembly.

After moving off the cam surfaces, the hook assembly gradually pivots about the point at which the hook assembly is secured to the endless chain due to the rising of the engaged vertical conveyor tracks.

After the carrier has been brought into the vertical conveyor, a suitable unlatching mechanism is provided to unlatch the hook from the carrier to permit independent motion.

After a transfer of a carrier from the ascending tracks of one vertical conveyor to the descending tracks of the second vertical conveyor, the carrier is transferred back onto the horizontal conveyor. To this end, with the vertical conveyor descending, the pin of a hook assembly travelling with the chain initially engages an upwardly inclined cam surface of the stationary cam of the discharge assembly. At this time, the discharge ramp assembly is in a lowermost position.

As the pin of a hook assembly begins to ride up the cam surface, the hook assembly is pivoted upwardly to cause the hook thereof to pivot upwardly and slightly forwardly. Also, as the hook assembly pin engages the downwardly inclined cam surface of the movable cam, the discharge ramp assembly is caused to pivot assembly. At this time, each spring biased pin of a latch assembly on the discharge ramp assembly engages and slides on the inclined surface of the stabilizer on the vertical conveyor track to be engaged. This causes the pin to be pushed into the latch assembly. When the discharge ramp assembly reaches the uppermost position, the spring biased pin springs outwardly to engage the upper edge of the stabilizer.

Thereafter, the hook of the hook assembly engages the carrier and begins to pull the carrier out of the vertical conveyor onto the ramp tracks while the ramp assembly begins to be lowered under gravity. Continued forward motion of the chain causes the hook assemblies to pull the carrier from the ramp tracks onto the guide tracks of the horizontal conveyor.

These and other objects and advantages of the invention will become more apparent from the following detailed description and appended claims taken in conjunction with the accompanying drawings in which:

Figure 1:
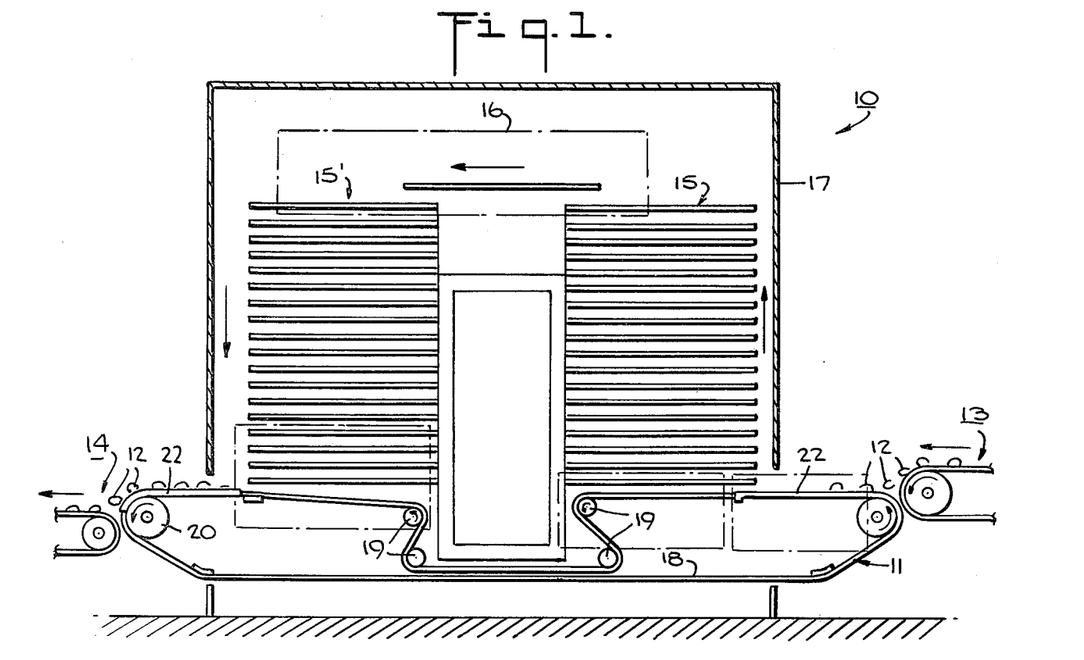
FIG. 1 illustrates a schematic view of the processing conveyor utilizing an infeed assembly and a discharge assembly in accordance with the invention.

Referring to FIG. 1, the processing conveyor 10 is constructed in a manner similar to that as described in U.S. Pat. No. 3,993,189. As shown, the processing conveyor 10 includes a horizontally disposed conveyor 11 having an infeed end at a loading station for receiving products 12, such as foodstuffs, from an infeed conveyor 13 and a discharge end for discharging the product 12 after treatment at a delivery station onto a discharge conveyor 14. In addition, the processing conveyor 10 has a pair of vertically disposed conveyors 15, 15' within a housing 16 to receive the product 12 from the horizontal conveyor 11 for treatment, for example for heating, drying, cooling, freezing, thawing or the like. A suitable transfer mechanism 16 is provided at the upper ends of the two vertically disposed conveyors 15, 15' to transfer the product 12 therebetween. A housing 17 encloses the vertical conveyors 15, 15', the transfer conveyor 16 and the means (not shown) for processing the products 12.

The horizontal conveyor 11 includes one or more, e.g. two, endless chains 18 which travel through an endless path as indicated in FIG. 1 guided by suitable guide rollers 19 and driven by a suitable drive roller 20. Each chain 18 carries a series of hook assemblies 21 (FIG. 2) which are disposed in spaced apart relation at predetermined intervals of the chain 18. The hook assemblies 21 serve to pull a series of product-receiving carriers 22 along upwardly inclined guide tracks 23 (FIG. 2) of the conveyor 11 which are located at the loading station end and delivery station end. Suitable guide tracks (not shown) are also provided along the lower run of the conveyor 11 to guide the carriers 22 during a return to the loading station. Likewise, suitable guides G (FIG. 6) are provided for guiding the chains 18 along the conveyor 10. Also, various tensioning means T (FIGS. 3 and 9) can be provided along the length of each chain 18 to permit an adjustment in tension of the return run of the chain.

Each vertical conveyor 15, 15' has a pair of oppositely disposed vertical elevators 24 (See FIG. 6), each of which has a plurality of tracks 25 which are mounted for movement in an endless vertically disposed path, for example, as described in U.S. Pat. No. 3,993,189. The upstream conveyor 15 is operated so as to sequentially receive and raise the carriers 22 from the horizontal conveyor 11 while the downstream conveyor 15' operates to sequentially receive and lower the carrier 22 back to the horizontal conveyor 11.

The transfer conveyor 16 is constructed, for example as described in U.S. Pat. No. 3,993,189, to transfer each carrier 22 in turn between the two vertical conveyors 15, 15'.

Figure 2:
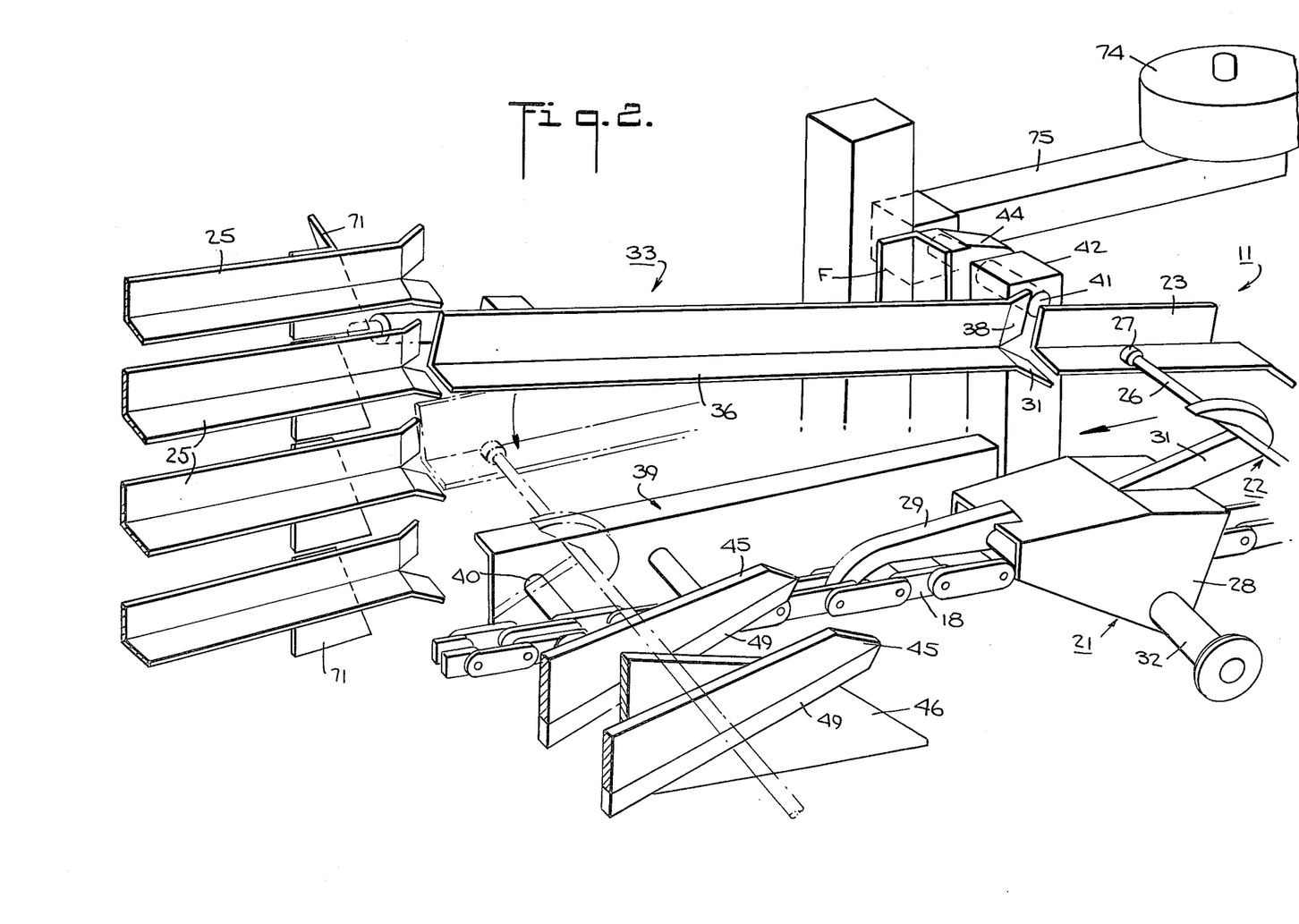
FIG. 2 illustrates a perspective view of a part of the infeed ramp assembly according to the invention.

Each carrier 22 is constructed as a flexible mat, for example, from a plurality of parallel rods (of which only the foremost rod 26 is shown in FIG. 2, for simplicity) which are interconnected together by links (not shown) and which carry wheels 27 at the ends to ride on the guide tracks 23, 25 of the conveyors 11, 15, 15'. In addition, each carrier 22 has an intermediate product-receiving surface or section (not shown), for example, of mesh-like construction to receive the products 12.

Referring to FIG. 2, each hook assembly 21 includes a housing 28 which is sized and shaped to straddle a chain 18 during travel therewith, a lever 29 which is secured to the housing 28 at one end and pivotally secured to the chain 18 at the opposite end via a pin 30, and a hook 31 which is fixed to the housing 28 in a projecting manner. The hook 31 is sized and shaped to engage the foremost rod 26 of a carrier 22 so as to pull the carrier 22 along the various guide tracks 23, 24 as the chain 18 moves. In addition, a pin 32 is fixed to a sidewall of the housing 28 to project sideways for purposes as described below.

Figure 3:
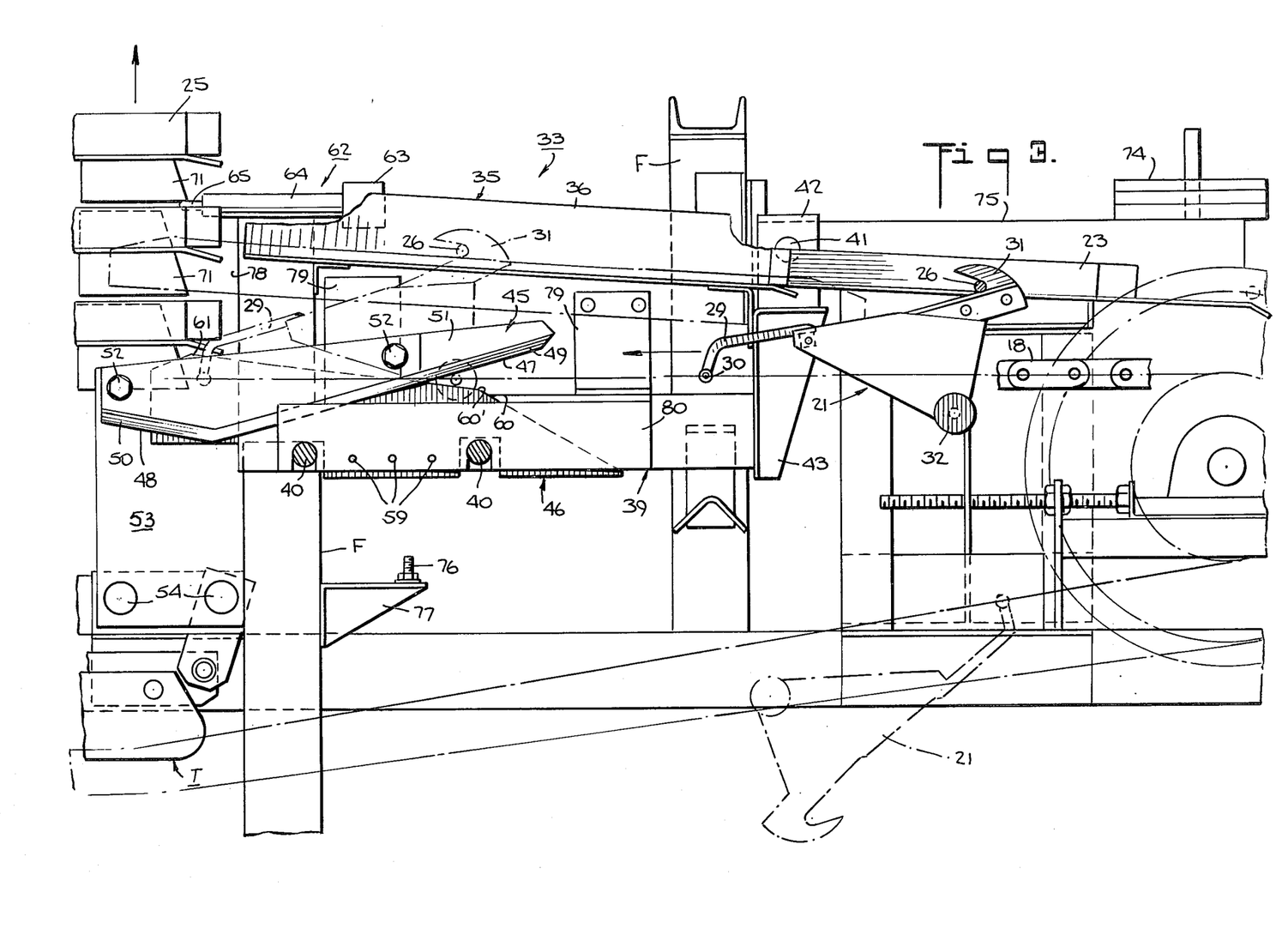
FIG. 3 illustrates the infeed ramp assembly according to the invention in an elevated position.

Referring to FIG. 3, in order to transfer a carrier 22 from the horizontal conveyor 11 to the first vertical conveyor 15, an infeed assembly 33 is provided between the guide tracks 23 of the horizontal conveyor 11 at the loading station end and the tracks 25 of the vertical conveyor 15. In like manner, referring to FIG. 8, a discharge assembly 34 is provided between the tracks 25 of the downstream vertical conveyor 15' and the guide tracks 23 of the horizontal conveyor 11 at the delivery station end to transfer a carrier from the vertical conveyor 15' back to the horizontal conveyor 14. Each of these assemblies 33, 34 is mechanically operated in response to the movement of the respective hook assemblies 21 on the endless chain 18 and each follows the movement of the associated vertical conveyor 15, 15' in a simple manner via a mechanical engagement.

Figure 7:
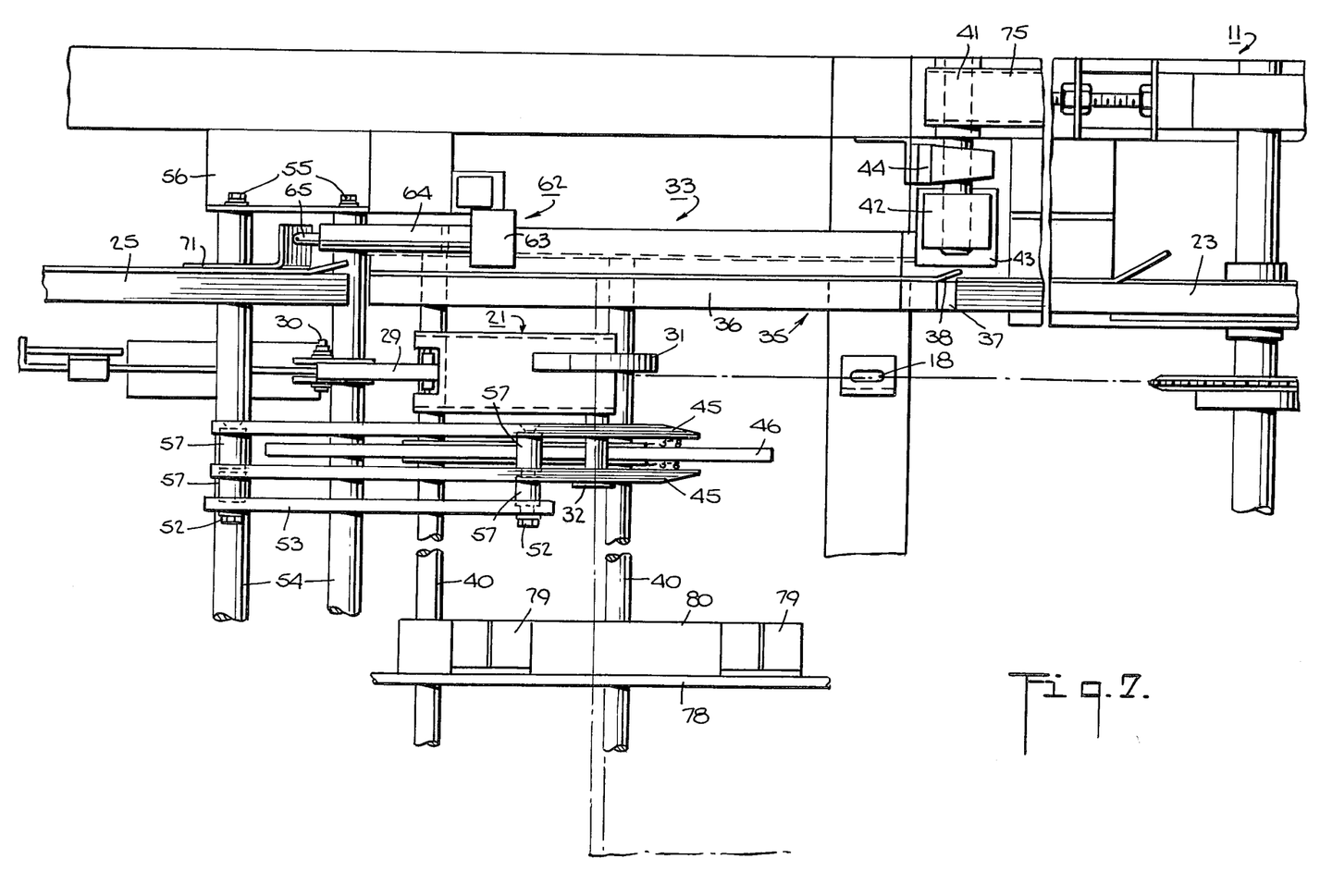
FIG. 7 illustrates a part plan view of the infeed assembly according to the invention.

Referring to FIGS. 3 and 7, the infeed assembly 33 includes a pivotally mounted ramp assembly 35 having a pair of ramp tracks 36 aligned with the guide tracks 23 of the horizontal conveyor 11 and a respective pair of tracks 25 of the elevators 24 of the conveyor 15. Each ramp track 25 (only one of which is shown) is made of L-shape with two legs each of which has a flared tab 37, 38 at the forward end to facilitate transfer of a carrier 22 from the guide tracks 23 onto the ramp tracks 25.

The ramp assembly 35 includes a rigid skeletal frame formed, in part, by a pair of side frames 39 to which the ramp tracks 36 are secured and a pair of cross-bars 40 which are fixed to the side frames 39 and extend across the width of the conveyor 10. In addition, the ramp assembly 35 which is symmetric about the longitudinal center axis carries a pivot pin 41 on each of two sides at the end nearest the guide tracks 23 of the horizontal conveyor 14. Each pivot pin 41 (FIG. 7) is fixed within a U-shaped housing 42 (FIG. 6) which is secured to a bracket 43 of the rigid frame of the ramp assembly 35 and is journalled in the frame of the horizontal conveyor 14 via a suitable bearing 44.

The infeed assembly 33 also has a cam means disposed in the path of travel of the hook assemblies 21 on each chain 18 for lowering the ramp assembly 35 in response to movement of a hook assembly 21 thereon. As shown in FIGS. 3 and 7, each cam means includes a pair of stationary cams 45 for sliding of a hook assembly pin 32 thereon and a cam 46 fixedly secured to the ramp assembly 35 for lowering the ramp assembly 35 during movement of the pin 33 thereon.

Referring to FIG. 3, each stationary cam 45 has a first downwardly inclined cam surface 47 and a followed upwardly inclined cam surface 48 to receive the pin 32. These cam surfaces 47, 48 can be formed by wear resistant strips 49, 50 secured to a plate 51. Each cam 45 is fixed to the frame F of the horizontal conveyor 11 in a suitable manner. For example, the plates 51 are secured via bolts 52 to a support plate 53, which in turn, is fixed to a pair of cross-bars 54 which extend across the conveyor 11. The cross-bars 54 are secured at each end e.g. via bolts 55 to a bracket 56 fixed to the frame F of the conveyor 11.

The two stationary cams 45 are spaced apart from each other and form the support 53 by tubular spacers 57 which envelope the bolts 52. As shown in FIG. 7, the cam 46 is located in the space between the stationary cams 45 for movement therebetween.

Referring to FIGS. 3 and 7, each cam 46 is fixed to the cross-bars 40 of the ramp assembly 35 via a pair of side plates 58 (FIGS. 6 and 7) which are secured via welds to the cross-bars 40 and nut and bolt assemblies 59 (FIG. 3) which pass through the plates 58 and cam 46. Each cam 46 has an initial upwardly inclined cam surface 60 to receive a hook assembly pin 32 a following upwardly inclined following cam surface 60' of less slope, and a final downwardly inclined cam surface 61. As shown in FIG. 3, the cam surfaces 47, 60' of the cams 45, 46 are disposed in crossing-relation to each other with the apex of the triangular space formed therebetween located slightly below the axis of the path of a chain 18.

Figure 5:
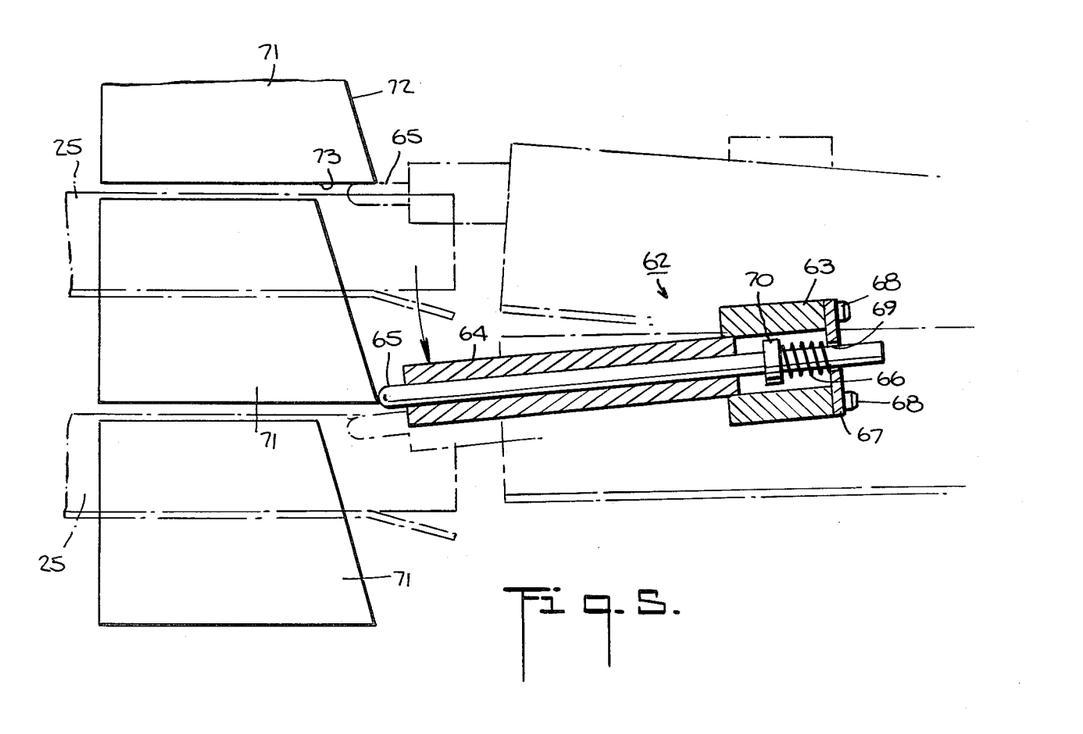
FIG. 5 illustrates a cross-sectional view of a releasable latch assembly according to the invention.

Referring to FIGS. 3, 5 and 7, the infeed assembly 33 also carries a pair of releasable latch assemblies 62 to engage with a pair of aligned tracks 25 of the vertical conveyor 15 and to permit movement of a carrier 22 from the ramp tracks 36 onto the aligned tracks 25 of the conveyor 15. Each latch assembly 62 is mounted adjacent to a ramp track 36 and includes a cylindrical housing 63, a barrel 64 which extends from the housing 63 and is secured, as by welds, to the rigid skeletal frame of the ramp assembly 35 and to the housing 63, a pin 65 which is slidably mounted in the barrel 64, and a spring 66 which is disposed in the housing 63 to bias the pin 65 outwardly. The housing 63 includes a back plate 67 which is secured in place via bolts 68 to close the interior of the housing 63 and provide a fixed abutment for the spring 66. The back plate 67 has an opening 69 to permit passage of the pin 65 and the pin 65 has an integral collar 70 within the housing 63 against which the spring 66 acts.

Referring to FIGS. 5 and 7, the tracks 25 of the conveyor 15 each carry a stabilizer 71 for engaging with a latch assembly 60 during operation of the processing conveyor 10. As shown in FIGS. 5 and 7, each stabilizer 71 is secured as by welding to a sidewall of an elevator track 25 to depend downwardly below the plane of the track 25. Each stabilizer 71 is L-shaped in cross-section and has an inclined surface 72 on the outstanding leg which faces the plane of a latch assembly 60. In addition, each stabilizer 71 has a lower edge 73 under the surface 72 which is horizontally disposed. During operation, the pin 65 of a latch assembly 60 is biased to lie under and engage with the lower edge 73 of a stabilizer 71 (FIG. 3). The inclined surface 72 is positioned to cause inward biasing of the pin 65 during a downward sliding of the pin 65 on the surface 72.

Referring to FIG. 3, the infeed assembly 33 also has a counterweight 74 secured to the ramp assembly 35 on an opposite side of one pivot pin 41 to facilitate pivoting of the ramp assembly 35. This counterweight 74 is mounted on lever 75 secured to one pivot pin 41 so as to pivot about the axis of the pin 41 as the ramp assembly 35 pivots.

Referring to FIG. 3, in order to limit the downward pivoting of the ramp assembly 35, the frame F of the conveyor 10 can be provided with a stop 76 on each side. As shown, each stop 76 is in the form of a threaded bolt which is fixed to a bracket 77 on the machine frame F in the path of for example, a wear plate (not shown) secured to a side frame 39 of the ramp assembly 35.

Figure 6:
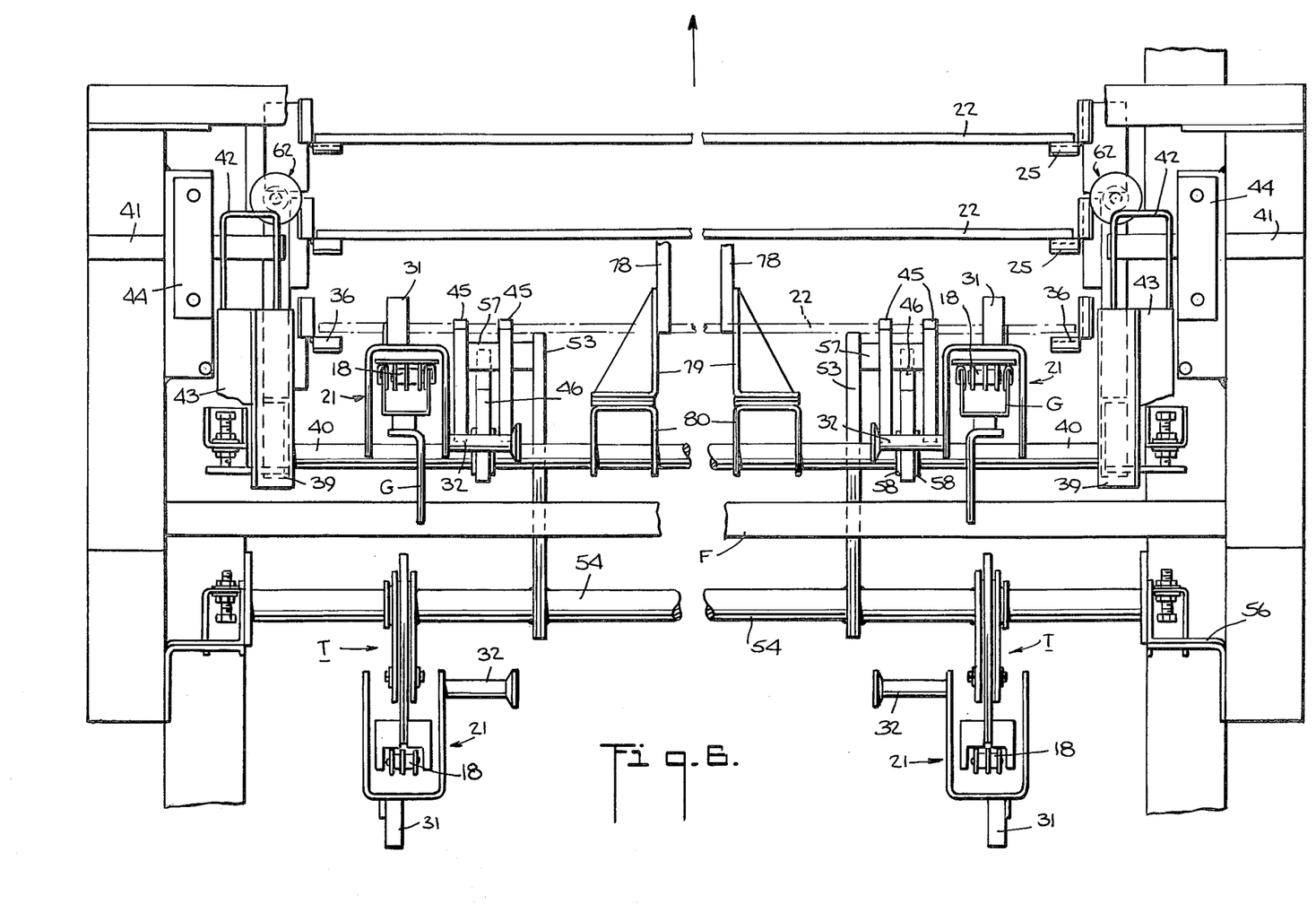
FIG. 6 illustrates a transverse cross-sectional view of the infeed assembly according to the invention.

In addition, in order to aid the guidance of the carriers 22, for example to avoid sag, the ramp assembly 35 carries a pair of guide rails 78. As shown in FIGS. 6 and 7, each guide rail 78 is mounted via a pair of upstanding brackets 79 and a horizontal inverted U-shaped beam 80 to the cross-bars 40. The upper surface of each guide rail 78 is located in a plane coincident with or slightly above the plane of the ramp tracks 35.

In operation, a series of carriers 22 are sequentially conveyed via the hook assemblies 21 by the chains 18 into the loading station adjacent the feed conveyor 12. At this point, product 12 is deposited onto each carrier 22 in sequence in a suitable manner. Each carrier 22 with a product 12 thereon is next conveyed to the infeed assembly 33.

Referring to FIGS. 2, and 3 when the forwardmost rod 26 of the carrier 22 is near the end of the guide tracks 23 of the horizontal conveyor 11, the ramp assembly 35 of the infeed assembly 33 is in a raised position, having directed a preceding carrier into the vertical conveyor 15.

As the hook assembly 21 continues to move with the chain 18, the pin 32 of each hook assembly first engages on the cam surface 60 of the movable cam 46. This causes the hook assembly 21 to pivot upwardly about the pin 30 via the lever 29. This upward pivoting of the hook assembly 21 allows the hook 31 to follow the initial upward movement of the rod 26 on the inclined guide tracks 23 and aligned ramp tracks 36.

Figure 4:
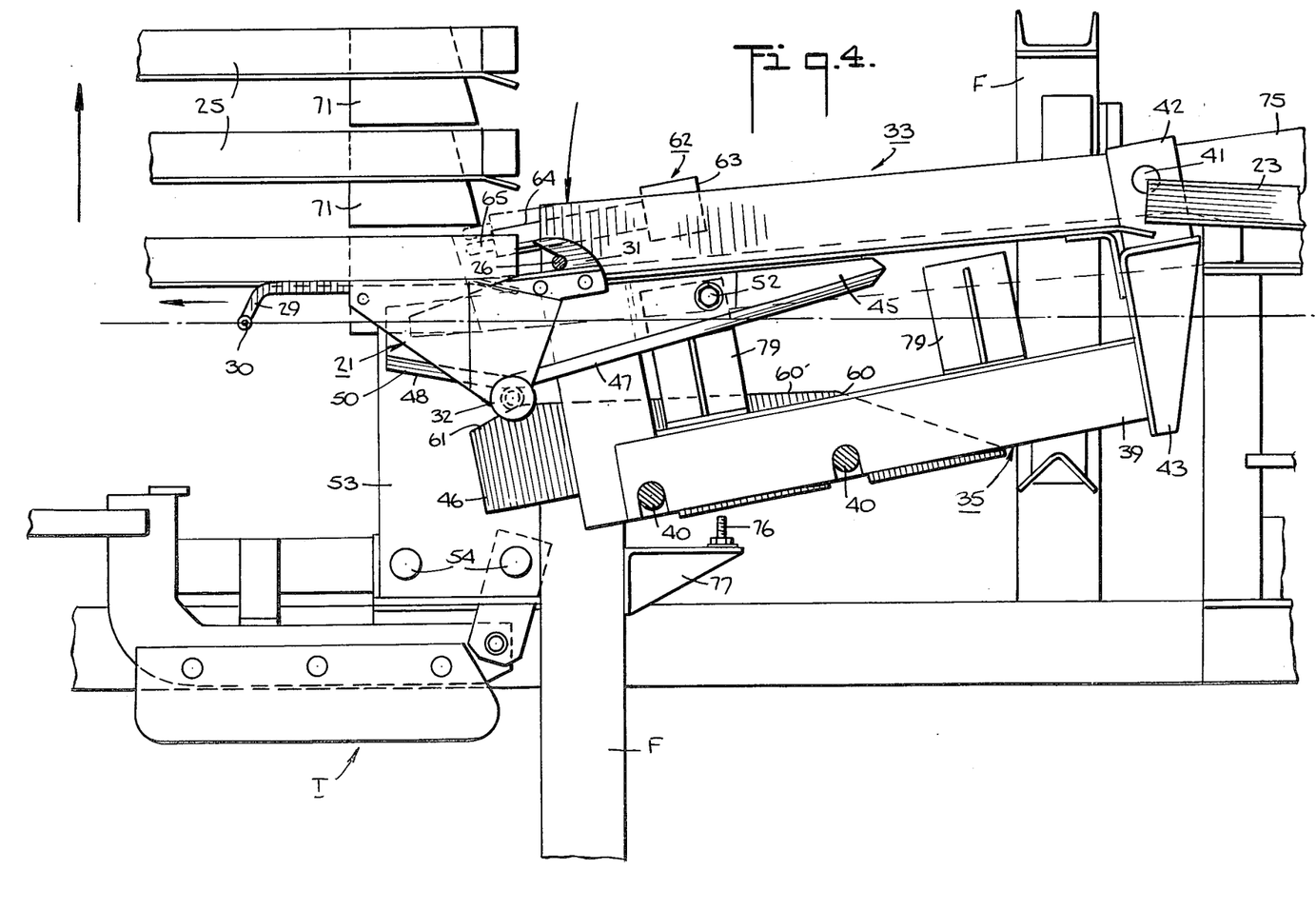
FIG. 4 illustrates the infeed ramp assembly according to the invention in a lowermost position.

As the pin 32 approaches the mutually crossing cam surfaces 60', 47 of the cams 46, 45, the upward pivoting of the hook assembly 21 ceases. At this time, because the cam 45 is stationary, the pin 32 begins to slide downwardly along the cam surface 47 and at the same time causes the movable cam 46 and interconnected ramp assembly 35 to pivot downwardly about the axis of the pivot pins 41. Each hook assembly 21 is likewise caused to pivot downwardly in corresponding manner. As the ramp assembly 35 pivots downwardly, the pin 65 of each latch assemblies 62 is forced to slide on the respective inclined surface 72 of a stabilizer 71 (See FIG. 5) which is secured to the elevator tracks 25 previously aligned with the ramp tracks 36. The pins 65 are forced inwardly until coming below the lower edge of the respective stabilizers 71. At this time, the pins 65 are biased outwardly (FIG. 4).

When the pin 32 has reached the lowermost point on the cam surface 47 (FIG. 4), the carrier rod 26 is at the end of the ramp tracks 35, the ramp assembly 35 is at the lowermost position, the pins 63 project beyond the lower edges 73 of the stabilizers 71, and the pin 32 is at the point of intersection of the cam surfaces 60', 61 of the cam 46. The pin 32 then begins to slide upwardly on the cam surface 48 while moving along the downwardly inclined cam surface 61 of the movable cam 46 such that the ramp assembly 35 begins to pivot upwardly under the bias of the counterweight 74. At this time, the pins 65 engage the lower edges 73 of the respective stabilizers 71.

Thereafter, the pin 32 of the hook assembly 21 passes out of the influence of the cams 45, 46 and the counterweight 74 causes the pins 65 of the latch assembly 62 to remain in engagement with the lower edges 73 of the stabilizers 71. At this time, the forwardmost rod 26 of the carrier has been moved from the ramp tracks 36 onto the upwardly moving elevator tracks 25 via the hook assemblies 21. As the elevator tracks 25 continue to move upwardly, the hook assemblies 21 continue to pull the carrier 22 onto the tracks 25. At the same time, each hook assembly 21 pivots about the pin 30 on the chain 18 to accommodate the upward movement.

When the carrier 22 has been pulled some distance onto the elevator tracks 25, a suitable mechanism is provided for unlatching the hook assemblies 21 from the carrier 22. This mechanism may operate at a faster speed than the speed of the hook assemblies so as to accelerate the movement of the carrier 22 into the vertical conveyor 15.

Figure 8:
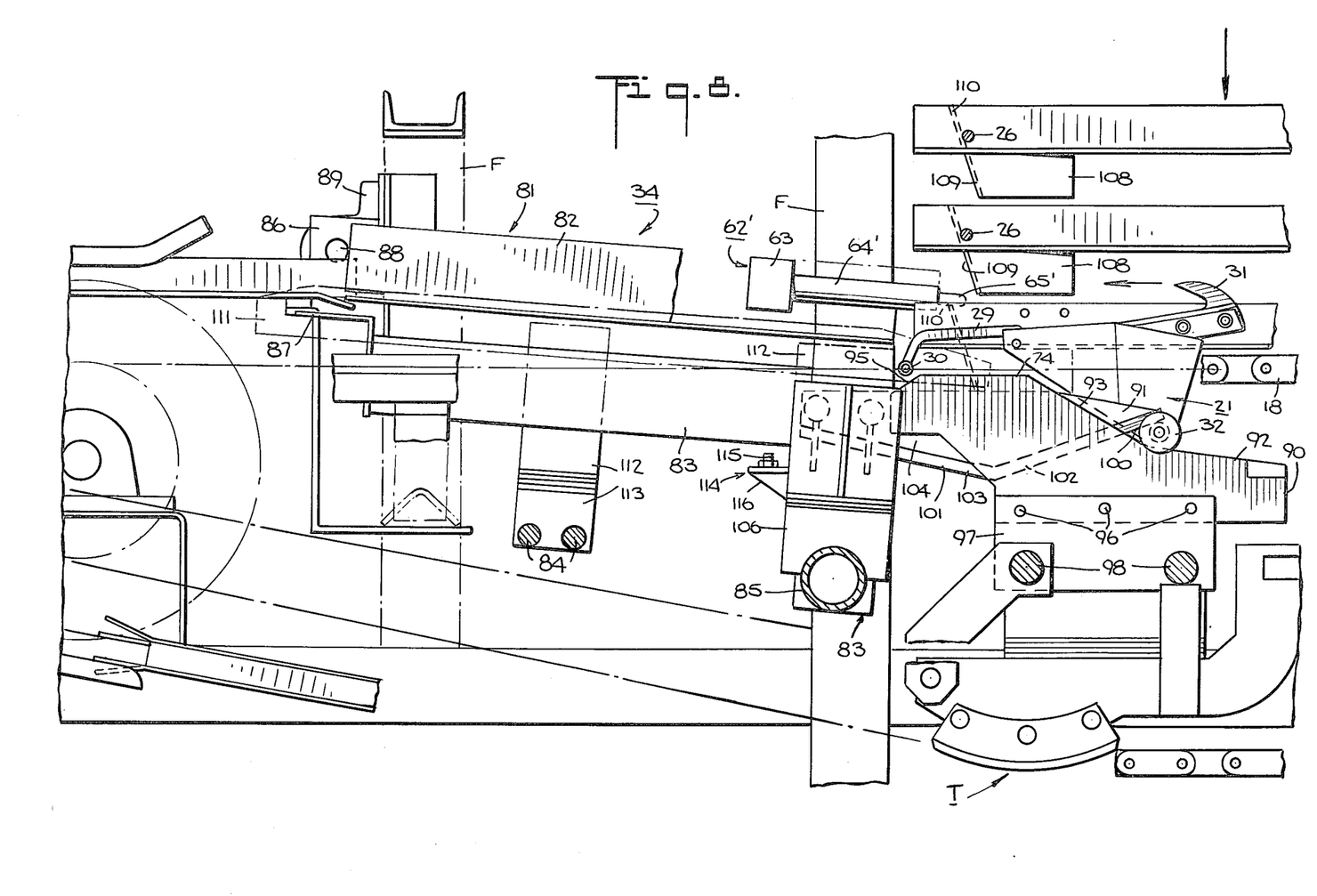
FIG. 8 illustrates a part cross-sectional view of a discharge assembly according to the invention in a lowermost position.

Referring to FIG. 8, the discharge assembly 34 includes a pivotally mounted ramp assembly 81 having a pair of ramp tracks 82 aligned with the guide tracks 23 of the horizontal conveyor 11 and a respective pair of tracks 25 of the vertical conveyor 15'. Each ramp track 82 is constructed in a manner similar to the ramp tracks 25 described above and are secured to rigid skeletal frame of the ramp assembly 81.

Figure 11:
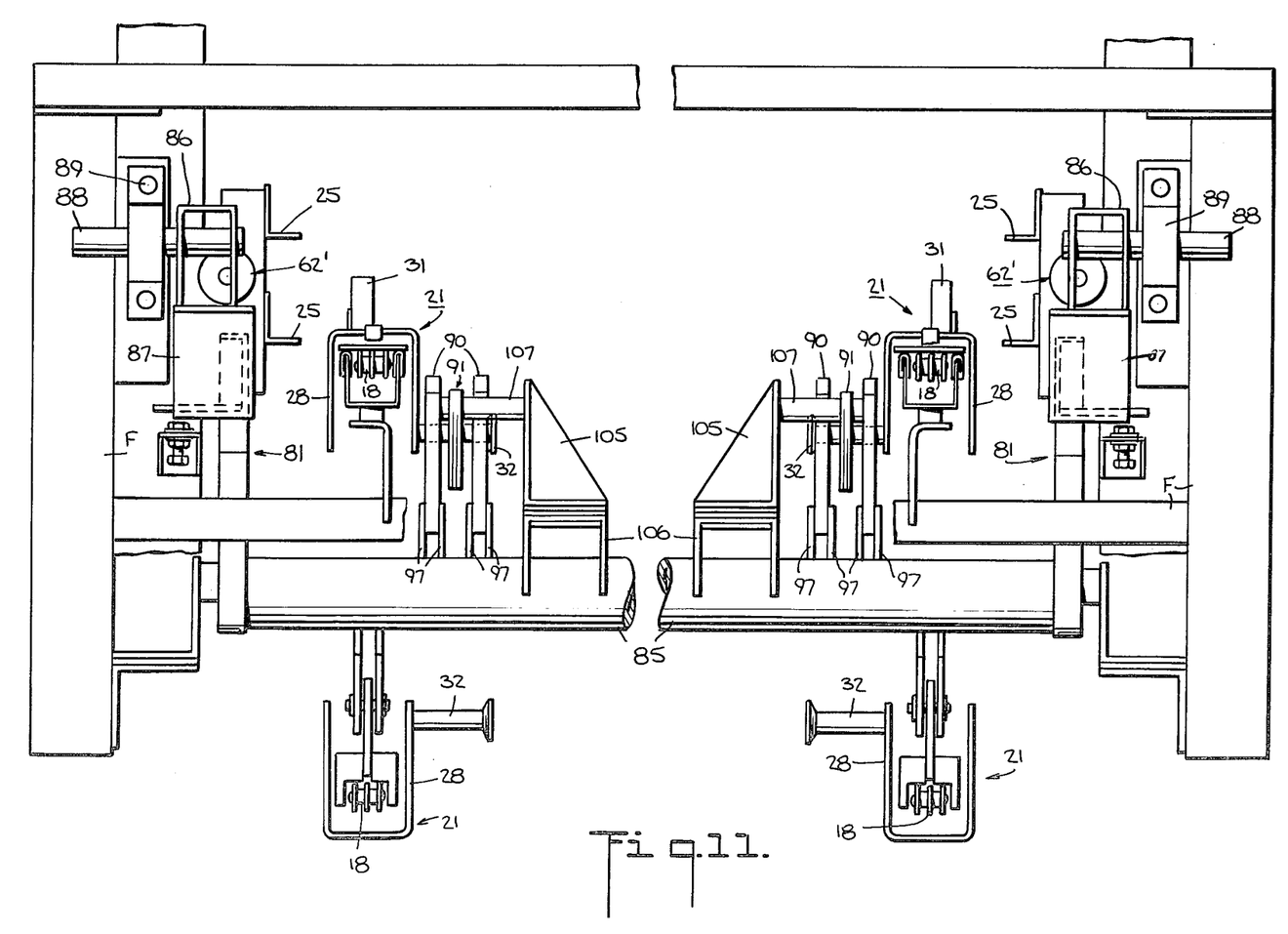
FIG. 11 illustrates a transverse cross-sectional view of the discharge assembly according to the invention.

The frame of the ramp assembly 81 which is symmetric about the longitudinal center axis is formed, in part, by a pair of side frames 83 which are interconnected by a pair of cross-bars 84 and a cross-tube 85 extending across the width of the conveyor 11. Each side frame 83 carries an inverted U-shaped housing 86 at one end via a bracket 87 (see FIG. 11) in which a pivot pin 88 is fixed. Each pin 88 is, in turn, journalled in a suitable bearing 89 secured to the frame F of the conveyor 10. The opposite end of each side frame 83 carries a latch assembly 62' identical to the above described latch assemblies and similar primed reference characters indicate like parts as above.

The discharge assembly 34 also includes cam means for raising the ramp assembly 81 in response to a predetermined movement of each hook assembly 21 on a chain 18. This cam means includes a pair of stationary cams 90 fixed to the conveyor frame F and a movable cam 91 secured to the ramp assembly 81.

The stationary cams 90 (FIG. 8) are each provided with a first upwardly inclined cam surface 92, a second more steeply inclined cam surface 93, a flat cam surface 94 and a following short downwardly inclined cam surface 95. Each stationary cam 90 is secured via nut and bolt assemblies 96 to a pair of depending shim plates 97 which, in turn, are secured as by welds to a pair of cross-bars 98. The cross-bars 98 extend across the conveyor 10 and are secured to the conveyor frame F via a suitable bracket 99 at each end (see FIG. 10).

Each movable cam 91 has a first downwardly inclined cam surface 100 and a following upwardly inclined cam surface 101 (FIG. 8) for receiving the pin 32 of a hook assembly 21. As above, the cam surfaces 100, 101 can be formed of wear-resistant strips 102, 103 while the remainder of the cam 91 is formed of a plate 104.

Figure 10:
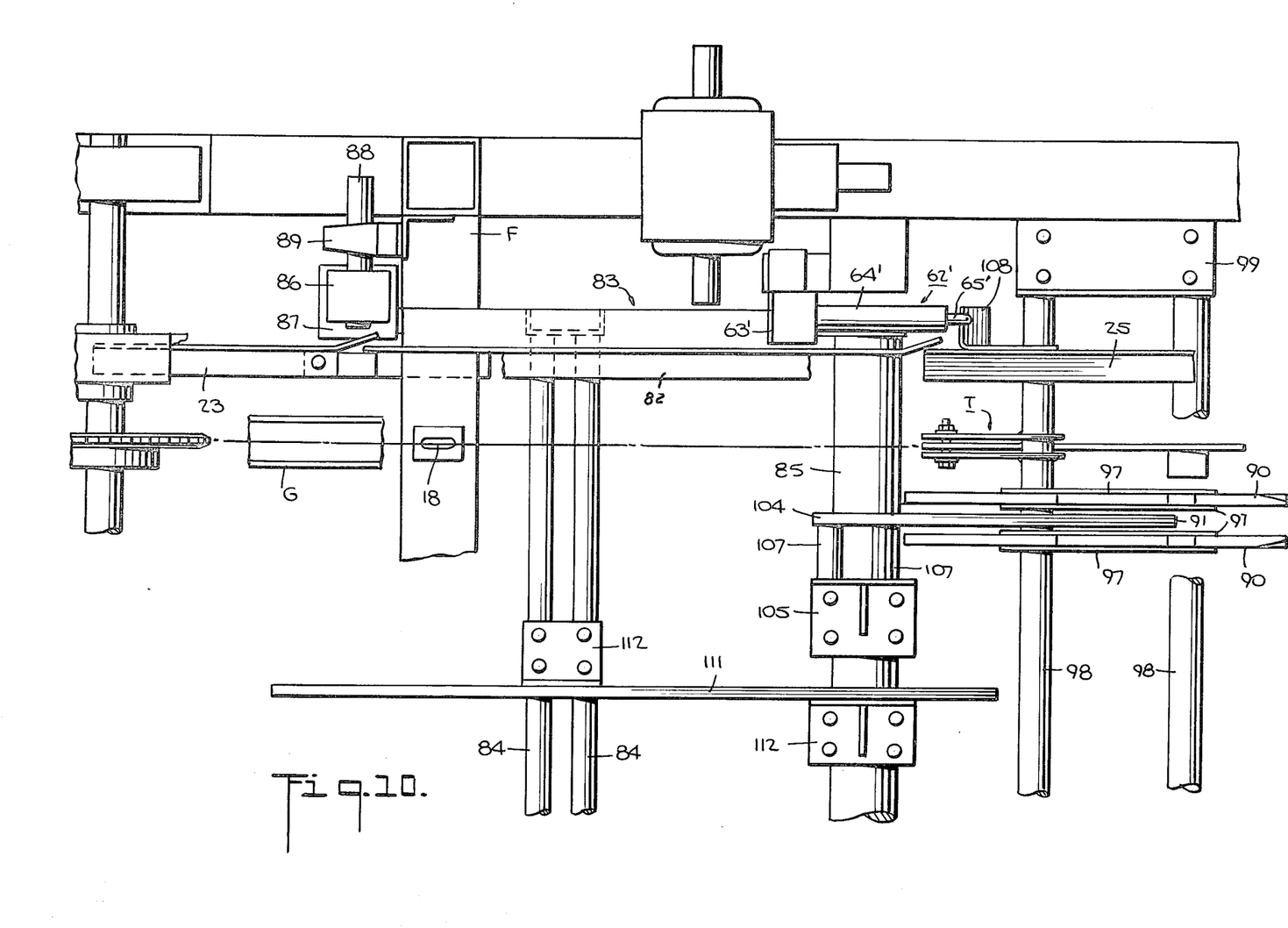
FIG. 10 illustrates a part plan view of the discharge assembly according to the invention.

Referring to FIGS. 8 and 10, the cam 91 is secured to the ramp assembly 81 to effect a pivoting movement of the ramp assembly 81 about the axis of the pivot pins 88 when a hook assembly pin 32 forces the cam 91 upwardly. To this end, the support tube 85 of the ramp assembly 81 carries an upstanding bracket 105 on a U-shaped support 106 and a pair of short horizontally disposed tubes 107 secured to the bracket 105. These tubes 107 are secured to a rear end of the cam plate 104 in suitable fashion.

Referring to FIGS. 8 and 10, each track 25 of the vertical conveyor 15' carries a stabilizer 108 similar to the above described stabilizer 71 but in a reversed orientation. That is, each stabilizer 108 has an inclined surface 109 facing downwardly and a straight upper edge 110 upon which a pin 63" of a latch assembly 62' may rest.

Referring to FIGS. 8 and 10, the ramp assembly 81 also carries a pair of guide rails 111 for guiding a carrier 22. Each guide rail 111 is mounted on the cross-bars 84 and cross-tube 85 via upstanding brackets 112 which are secured to inverted U-shaped supports 113 on the respective cross-bars 84 and cross-tube 85.

Referring to FIG. 8, in order to limit downward pivoting of the ramp assembly 81, a stop 114 is secured to each side of the conveyor frame F for abutting an underside of a side frame 83. The stop 114 is formed, for example, by a threaded bolt 115 secured on a bracket 116 on the frame F. Each side frame 83 may also be provided with a suitable wear plate at the place where contact is made with the bolt 115.

A motor can be used to drive the chains 18 through a reduction means (not shown) and the drive roller (or sprockets).

In operation, after the carriers 22 have been transferred from the ascending vertical conveyor 15 to the descending vertical conveyor 15' via the transfer conveyor 16 (FIG. 1), the carriers 22 are sequentially transferred to the main chain 18 of the horizontal conveyor 11. To this end, the conveyors 11, 15' are synchronized so that the hook assemblies 21 arrive at a given point relative to the position of a carrier 22 on the descending conveyor 15'. At this time, the ramp assembly 81 is in a downwardly inclined position resting on the stabilizers 108 of two elevator tracks 25 from which a preceding carrier 22 is being removed and for example as shown in FIG. 8, the pin 32 of a hook assembly 21 engages the cam surface 100 of the movable cam 91. Thereafter, the pin 32 continues movement along the cam surface 100, and engages the cam surface 93 of each stationary cam 90. This causes the hook assembly to pivot in an upward direction. The ramp assembly 81 then begins to pivot upwardly about the axis of the pivot pins 88. During this time, the pins 65' of the latch assemblies 62' slide on the inclined surfaces 109 of the respective stabilizers 108 located immediately above the latch assemblies 62'.

Figure 9:
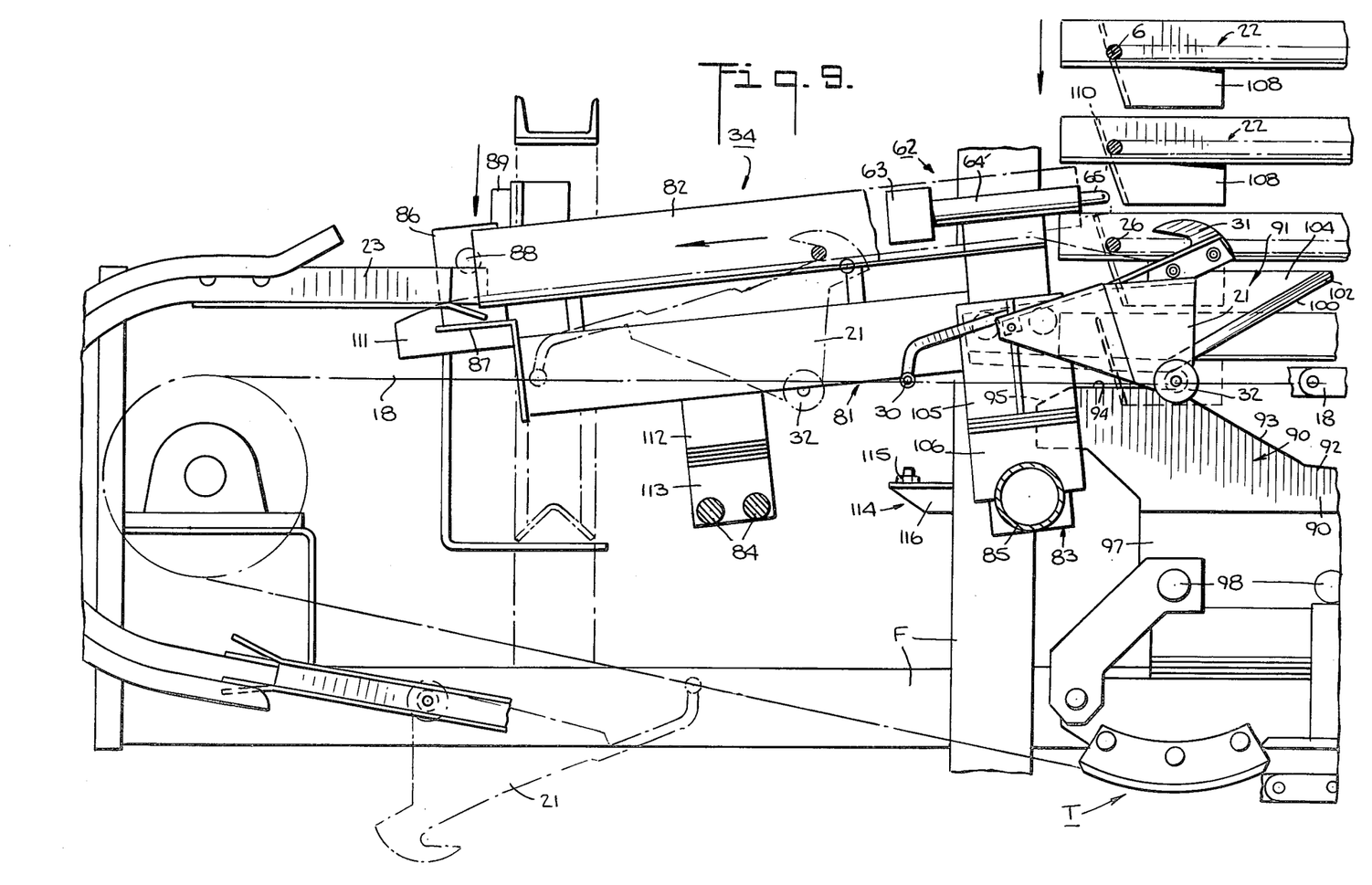
FIG. 9 illustrates a view similar to FIG. 8 of the discharge assembly in a raised position to receive a carrier in accordance with the invention.

Upon reaching an uppermost pivot position of the ramp assembly 81, the pins 65' snap outwardly over the upper edges 110 of the respective stabilizers 108. At this point, the pin 32 of each hook assembly 21 has reached the lowermost point on the movable cam 91 as well as the flat horizontal cam surface 94 of each stationary cam 90 (FIG. 9). Also, the hook 31 of each hook assembly 21 has moved behind and into the plane of the foremost rod 26 of the carrier 22. As the pin 32 continues to move along the cam surface 94, the hook 31 moves into engagement with the rod 26.

Thereafter, the ramp assembly 81 moves downwardly with the descending elevator tracks 25 under gravity while resting via the pins 65' on the stabilizers 108.

Preferably, the lowermost point on the movable cam 91 is positioned relative to the point at which the inclined cam surface 93 meets the flat cam surface 94 such that the ramp assembly 81 reaches its uppermost position at this point.

Referring to FIG. 9, after the hook 31 of the hook assembly 21 engages the foremost rod 26 of the carrier 22, the pin 32 of each hook assembly 21 slides along and off the cam surfaces 95, 101 of the cams 90,91 while the ramp assembly 81 pivots downwardly. Continued movement of the chain 18 and hook assembly 21 pulls the carrier 22 from the elevator tracks 25 onto the ramp tracks 82 as the conveyor 15' descends. The extracted carrier 22 is then brought into the delivery station where the product 12 can be deposited onto the delivery conveyor 13 (see FIG. 1).

Thereafter, the hook assemblies 21 pull the carrier 22 along the return run of the horizontal conveyor 11 along suitable guide tracks (not shown) back to the loading station.

The invention thus provides a processing conveyor with relatively simple infeed and discharge ramp assemblies. In this regard, each ramp assembly is mechanically actuated by the movements of the hook assemblies of the conveyor. Thus, various types of motors, clutches and gears can be eliminated.

Further, since the ramp assemblies are freely pivotable, the assemblies can be simply raised in a cam actuated manner mechanically and thereafter allowed to descend under gravity while being maintained in alignment with the respective elevators.

The ramp assemblies can be fabricated of relatively simple parts and of any suitable materials suitable to the mode of operation of the overall processing conveyor.

The invention further provides infeed and discharge assemblies whereby flexible carriers can be easily and quickly transferred between a horizontal conveyor and a vertically oriented conveyor and vice versa.

What is claimed is:
1. In combination, a first conveyor having a pair of guide tracks for guiding a product-receiving carrier thereon, at least one endless chain for movement in an endless path, and at least one hook assembly secured to said chain for travel therewith, said hook assembly having a hook for engaging and pulling a carrier along said guide tracks during movement of said chain;

a second conveyor having a pair of oppositely disposed vertical elevators, each elevator having a plurality of tracks thereon for movement in an endless vertically disposed path; and an infeed assembly for moving a carrier from said guide tracks of said first conveyor onto a pair of opposed tracks of said second conveyor; said infeed assembly including a pivotally mounted ramp assembly having a pair of ramp tracks aligned with said guide tracks of said first conveyor to permit movement of a carrier from said guide tracks onto said ramp tracks, cam means disposed in the path of travel of said hook assembly for lowering said ramp assembly in response to movement of said hook assembly thereon, and a releaseable latch assembly mounted adjacent at least one of said ramp tracks to engage a track of said second conveyor to align said ramp tracks with a pair of opposed tracks of said second conveyor to permit movement of a carrier from said ramp tracks onto said aligned tracks of said second conveyor.

2. The combination as set forth in claim 1 wherein cam means includes a first cam secured to said ramp assembly and having a first cam surface for movement of said hook assembly thereon and at least one stationary cam having a cam surface for movement of said hook assembly thereon, said cam surfaces being disposed in crossing relation whereby simultaneous movement of said hook assembly on said cam surfaces causes a lowering of said ramp assembly.

3. The combination as set forth in claim 2 wherein said stationary cam has a downwardly inclined cam surface to receive said hook assembly thereon and said first cam has an upwardly inclined cam surface to receive said hook assembly thereon.

4. The combination as set forth in claim 3 wherein said hook assembly has a projecting pin for sliding on said respective cam surfaces.

5. The combination as set forth in claim 1 wherein said hook assembly is pivotally mounted on said chain and includes a projecting pin for sliding on said respective cam surfaces.

6. The combination as set forth in claim 1 wherein said infeed assembly further comprises a second cam means disposed in the path of travel of said hook assembly upstream of said first cam means for initially raising said hook to facilitate travel of a pulled carrier on said ramp tracks.

7. The combination as set forth in claim 6 wherein said first cam means includes a stationary cam having a downwardly inclined cam surface for sliding of said hook assembly thereon and a second cam fixedly secured to said ramp assembly and having a first upwardly inclined cam surface in crossing relation to said downwardly inclined cam surface to receive said hook assembly thereon; said second cam means forming a second upwardly inclined cam surface on said second cam upstream of said first cam surface.

8. The combination as set forth in claim 1 wherein said latch assembly includes a spring biased pin directed toward said second conveyor for engaging an underside of an aligned track of said second conveyor.

9. The combination as set forth in claim 8 wherein each track of said second conveyor has a stabilizer secured thereon for engagement of said pin of said latch assembly under a lower edge thereof, each said stabilizer having an inclined surface for sliding of said pin thereon to cause inward biasing of said pin during a lowering of said ramp assembly.

10. The combination as set forth in claim 1 wherein said ramp assembly is pivotable about an axis adjacent said first conveyor and said infeed assembly further comprises a counterweight on an opposite side of said pivot axis from said ramp assembly.

11. The combination as set forth in claim 1 wherein cam means includes a first cam secured to said ramp assembly and having a first cam surface for movement of said hook assembly thereon and at least one stationary cam having a cam surface for movement of said hook assembly thereon, said cam surfaces being disposed in crossing relation whereby simultaneous movement of said hook assembly on said cam surfaces causes a lowering of said ramp assembly; and wherein said latch assembly includes a spring biased pin directed toward said second conveyor for engaging an underside of an aligned track of said second conveyor.

12. The combination as set forth in claim 11 wherein said hook assembly is pivotally secured to said chain and has a projecting pin for engaging said respective cam surfaces.

13. An infeed assembly for moving a carrier from a horizontally disposed first conveyor having a hook assembly for conveying the carrier thereon to a vertically disposed second conveyor, said infeed assembly comprising a pivotally mounted ramp assembly having a pair of ramp tracks for guiding a carrier thereon, said ramp assembly being pivotally mounted about a pivot axis;

at least one cam means for lowering said ramp assembly in response to the hook assembly moving into a predetermined position; and a releaseable latch assembly mounted on at least one of said ramp tracks for engaging with the second conveyor during a subsequent upward pivoting of said ramp assembly.

14. An infeed assembly as set forth in claim 13 wherein said cam means includes at least one stationary cam having a cam surface thereon and a second cam fixedly secured to said ramp assembly and having a cam surface thereon disposed in crossing relation to said cam surface of said stationary cam to receive the hook assembly therebetween.

15. An infeed ramp assembly as set forth in claim 13 wherein said latch assembly includes a spring biased pin directed outward of said ramp tracks.

16. An infeed ramp assembly as set forth in claim 13 which further comprises a counterweight on an opposite side of said pivot axis from said ramp assembly.

17. In combination a first conveyor having a pair of guide tracks for guiding a product-receiving carrier thereon, at least one endless chain for movement in an endless path, and at least one hook assembly secured to said chain for travel therewith, said hook assembly having a hook for engaging and pulling a carrier along said guide tracks during movement of said chain;

a second conveyor having a pair of oppositely disposed vertical elevators, each elevator having a plurality of tracks thereon for movement in an endless vertically disposed path; and a discharge assembly for moving a carrier from a pair of opposed tracks of said second conveyor onto said guide tracks of said first conveyor, said discharge assembly including a pivotally mounted ramp assembly having a pair of ramp tracks aligned with said guide tracks of said first conveyor to permit movement of a carrier from said ramp tracks onto said guide tracks, cam means disposed in the path of travel of said hook assembly for raising said ramp assembly in response to movement of said hook assembly thereon and a releseable latch assembly mounted on at least one of said ramp tracks to engage a track of said second conveyor to align said ramp tracks with a pair of opposed tracks of said second conveyor to permit movement of a carrier from said aligned tracks of said second conveyor onto said ramp tracks.

18. The combination as set forth in claim 17 wherein said cam means includes at least one stationary cam having a cam surface for movement of said hook assembly thereon to raise said hook and a second cam fixedly secured to said ramp assembly and having a cam surface for movement of said hook assembly thereon, said cam surfaces being disposed in crossing relation whereby simultaneous movement of said hook assembly on said cam surfaces causes a lifting of said ramp assembly.

19. The combination as set forth in claim 18 wherein said stationary cam has an upwardly inclined cam surface to receive said hook assembly thereon and said second cam has a downwardly inclined cam surface to receive said hook assembly thereon.

20. The combination as set forth in claim 19 wherein said hook assembly is pivotally mounted on said chain and has a projecting pin for sliding on said cam surfaces.

21. The combination as set forth in claim 20 wherein said hook assembly is pivotally secured at one end to said chain and said hook is located at an opposite end.

22. The combination as set forth in claim 17 wherein said latch assembly includes a spring biased pin directed toward said second conveyor for engaging on an aligned track of said second conveyor.

23. The combination as set forth in claim 22 wherein each track of said second conveyor has a stabilizer secured thereon for engagement of said pin on an upper edge thereof, each said stabilizer having an inclined surface for sliding of said pin thereon to cause inward biasing of said pin during a raising of said ramp tracks.

24. The combination as set forth in claim 17 wherein said ramp assembly is pivotable about an axis spaced from said second conveyor.

25. The combination as set forth in claim 17 wherein said cam means includes at least one stationary cam having an upwardly inclined cam surface for sliding of said hook assembly thereon to raise said hook, and a second cam fixedly secured to said ramp tracks and having a downwardly inclined cam surface in crossing relation to said upwardly inclined cam surface to receive said hook assembly thereon; and wherein said latch assembly includes a spring biased pin directed toward said second conveyor for engaging on an aligned track of said second conveyor.

26. The combination as set forth in claim 17 wherein said ramp assembly further includes a pair of parallel elongated carrier supports between said ramp tracks for supporting a carrier thereon.

27. A discharge assembly for moving a carrier to a horizontally disposed first conveyor having a hook assembly for conveying the carrier thereon from a vertically disposed second conveyor, said discharge assembly comprising a pivotally mounted ramp assembly having a pair of pivotally mounted ramp tracks for guiding a carrier thereon, said ramp assembly being pivotally mounted about a pivot axis;

at least one cam means for raising said ramp assembly in response to the hook assembly moving into a predetermined position; and a releaseable latch assembly mounted on at least one of said ramp tracks for engaging with the second conveyor during a subsequent downward pivoting of said ramp assembly.

28. A discharge assembly as set forth in claim 27 wherein said cam means includes at least one stationary cam having a cam surface thereon and a second cam fixedly secured to said ramp assembly and having a cam surface thereon disposed in crossing relation to said cam surface of said stationary cam to receive the hook assembly therebetween.

29. A discharge ramp assembly as set forth in claim 27 wherein said latch assembly includes a spring biased pin directed outward of said ramp tracks.

* * * * *

UNITED STATES PATENT AND TRADEMARK OFFICE
CERTIFICATE OF CORRECTION

PATENT NO. : 4,232,779

DATED : November 11, 1980

INVENTOR(S) : Royzas R. Khoylian, James R. Cowdery and David B. Park

It is certified that error appears in the above—identified patent and that said Letters Patent is hereby corrected as shown below:

Column 3, lines 66 and 67, change "assembly" to --upwardly--

Column 6, line 28, change "followed" to --following--

Signed and Sealed this

Fourteenth Day of April 1981

[SEAL]

Attest:

RENE D. TEGTMEYER

Attesting Officer     Acting Commissioner of Patents and Trademarks